US010122990B2

United States Patent
Konttori et al.

(10) Patent No.: US 10,122,990 B2
(45) Date of Patent: Nov. 6, 2018

(54) IMAGING SYSTEM AND METHOD OF PRODUCING CONTEXT AND FOCUS IMAGES

(71) Applicant: Varjo Technologies Oy, Helsinki (FI)

(72) Inventors: Urho Konttori, Helsinki (FI); Klaus Melakari, Oulu (FI); Mikko Ollila, Tampere (FI); Ville Miettinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 15/633,912

(22) Filed: Jun. 27, 2017

(65) Prior Publication Data

US 2018/0160100 A1 Jun. 7, 2018

Related U.S. Application Data

(63) Continuation-in-part of application No. 15/366,424, filed on Dec. 1, 2016, now Pat. No. 9,711,072.

(51) Int. Cl.
*G09G 1/00* (2006.01)
*H04N 13/25* (2018.01)
(Continued)

(52) U.S. Cl.
CPC ......... *H04N 13/25* (2018.05); *G02B 27/0101* (2013.01); *G06F 3/013* (2013.01);
(Continued)

(58) Field of Classification Search
CPC .. G06T 5/00; G06T 3/40; G06T 15/20; G06T 19/00; G06F 3/01; G02B 27/00; G02B 27/01
See application file for complete search history.

(56) References Cited

U.S. PATENT DOCUMENTS

2010/0149073 A1 6/2010 Chaum et al.
2016/0335981 A1 11/2016 Koo et al.
(Continued)

FOREIGN PATENT DOCUMENTS

EP 1898632 A1 3/2008
WO 20130082387 A1 6/2013

OTHER PUBLICATIONS

Partial Search received for International Patent Application No. PCT/FI2017/050826, dated Mar. 2, 2018, 14 pages.
(Continued)

*Primary Examiner* — Michael Faragalla
(74) *Attorney, Agent, or Firm* — Ziegler IP Law Group, LLC

(57) ABSTRACT

Disclosed is an imaging system and a method of producing a context image and a focus image for a display apparatus, via the imaging system. The imaging system includes at least one imaging sensor per eye of a user, and a processor coupled thereto. The processor is configured to control the imaging sensors to capture at least one image of a real world environment, and is arranged to be communicably coupled with the display apparatus. Furthermore, the processor is configured to: receive, from the display apparatus, information indicative of a gaze direction of the user; determine a region of visual accuracy of the at least one image, based upon the gaze direction of the user; process the at least one image to generate the context image and the focus image; and communicate the generated context image and the generated focus image to the display apparatus.

15 Claims, 3 Drawing Sheets

(51) Int. Cl.
*H04N 13/344* (2018.01)
*H04N 13/296* (2018.01)
*G06F 3/01* (2006.01)
*H04N 5/232* (2006.01)
*H04N 5/347* (2011.01)
*H04N 5/355* (2011.01)
*G02B 27/01* (2006.01)

(52) U.S. Cl.
CPC ..... *H04N 5/23219* (2013.01); *H04N 5/23241* (2013.01); *H04N 5/347* (2013.01); *H04N 5/355* (2013.01); *H04N 13/296* (2018.05); *H04N 13/344* (2018.05); *G02B 2027/014* (2013.01); *G02B 2027/0138* (2013.01); *G02B 2027/0147* (2013.01); *G02B 2027/0187* (2013.01)

(56) References Cited

U.S. PATENT DOCUMENTS

2016/0343164 A1* 11/2016 Urbach ................ G06T 19/006
2017/0287112 A1* 10/2017 Stafford ................... G06T 5/00

OTHER PUBLICATIONS

International Search Report and Written Opinion of the International Searching Authority received for International Application No. PCT/FI2017/050826, dated Jun. 5, 2018, 21 pages.

* cited by examiner

IMAGING SYSTEM AND METHOD OF PRODUCING CONTEXT AND FOCUS IMAGES

CROSS-REFERENCE TO RELATED APPLICATIONS

This application is a continuation-in-part application of U.S. patent application Ser. No. 15/366,424, titled "DISPLAY APPARATUS AND METHOD OF DISPLAYING USING FOCUS AND CONTEXT DISPLAYS" and filed on Dec. 1, 2016, the disclosure of which is incorporated herein by reference in its entirety.

TECHNICAL FIELD

The present disclosure relates generally to representation of visual information; and more specifically, to imaging systems comprising imaging sensors and processors. Furthermore, the present disclosure also relates to methods of producing context and focus images for display apparatuses via the aforementioned imaging systems.

BACKGROUND

Recently, technologies such as virtual reality, augmented reality, and so forth, have witnessed a rapid increase in their use. Such technologies present a simulated environment (or a virtual world) to a user of a specialized device. In such instance, the user is provided with a greater feeling of immersion in the simulated environment, by using contemporary techniques such as stereoscopy, that enhance the user's perception of reality around him/her.

Generally, devices such as virtual reality devices are used by the user to experience the simulated environment. In an example, the virtual reality device may be a binocular virtual reality device having one display per eye of the user. Furthermore, different two-dimensional images (also known as stereograms) are displayed on both displays of the binocular virtual reality device. Specifically, such different two-dimensional images are combined to create an illusion of depth and consequently, the combined image is projected onto the eyes of the user. Often, such different two-dimensional images may be captured and communicated by suitable imaging equipment, to the virtual reality devices.

However, conventionally employed imaging equipment have certain limitations. Firstly, the existing imaging equipment are limited in their ability to capture two-dimensional images of a very high resolution. Moreover, the imaging equipment requires an impractical number of photo sensors to replicate visual acuity of human visual system in the captured two-dimensional images. Secondly, the imaging equipment requires large bandwidth to communicate the captured two-dimensional images to the virtual reality devices. Consequently, there exist limitations in meeting data throughput limitations of a communication network between the imaging equipment and the virtual reality devices. Thirdly, the imaging equipment consume significant amount of power to capture, process and communicate the captured two-dimensional images to the virtual reality devices.

Therefore, in light of the foregoing discussion, there exists a need to overcome the aforementioned drawbacks associated with imaging equipment associated with virtual reality devices.

SUMMARY

The present disclosure seeks to provide an imaging system. The present disclosure also seeks to provide a method of producing a context image and a focus image for a display apparatus, via such an imaging system. The present disclosure seeks to provide a solution to the existing problem of limited resolution and bandwidth limitations associated with conventional imaging equipment. An aim of the present disclosure is to provide a solution that overcomes at least partially the problems encountered in the prior art, and provides a robust, reliable and efficient imaging system for use with the display apparatus.

In one aspect, an embodiment of the present disclosure provides an imaging system comprising:
   at least one imaging sensor per eye of a user; and
   a processor coupled to the at least one imaging sensor, the processor being configured to control the at least one imaging sensor to capture at least one image of a real world environment,
   wherein the processor is arranged to be communicably coupled with a display apparatus, the display apparatus comprising means for tracking a gaze direction of the user, at least one context image renderer for rendering a context image, and at least one focus image renderer for rendering a focus image,
   further wherein the processor is configured to:
      receive, from the display apparatus, information indicative of the gaze direction of the user;
      determine a region of visual accuracy of the at least one image, based upon the gaze direction of the user;
      process the at least one image to generate the context image and the focus image, the context image having a first resolution and the focus image having a second resolution, the second resolution being higher than the first resolution, wherein, when processing the at least one image, the processor is configured to crop the at least one image to generate the focus image in a manner that the focus image substantially corresponds to the region of visual accuracy of the at least one image; and
      communicate the generated context image and the generated focus image to the display apparatus.

In another aspect, an embodiment of the present disclosure provides a method of producing a context image and a focus image for a display apparatus, via an imaging system comprising at least one imaging sensor per eye of a user, the imaging system being communicably coupled with the display apparatus, the method comprising:
   receiving, from the display apparatus, information indicative of a gaze direction of the user;
   controlling the at least one imaging sensor to capture at least one image of a real world environment;
   determining a region of visual accuracy of the at least one image, based upon the gaze direction of the user;
   processing the at least one image to generate the context image and the focus image, the context image having a first resolution and the focus image having a second resolution, the second resolution being higher than the first resolution, wherein the processing of the at least one image comprises cropping the at least one image to generate the focus image in a manner that the focus image substantially corresponds to the region of visual accuracy of the at least one image; and
   communicating the generated context image and the generated focus image to the display apparatus.

Embodiments of the present disclosure substantially eliminate or at least partially address the aforementioned problems in the prior art, and enables enhancement of resolution during capture of images using the imaging system and use of limited bandwidth for communication of focus and context images from the imaging system to the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
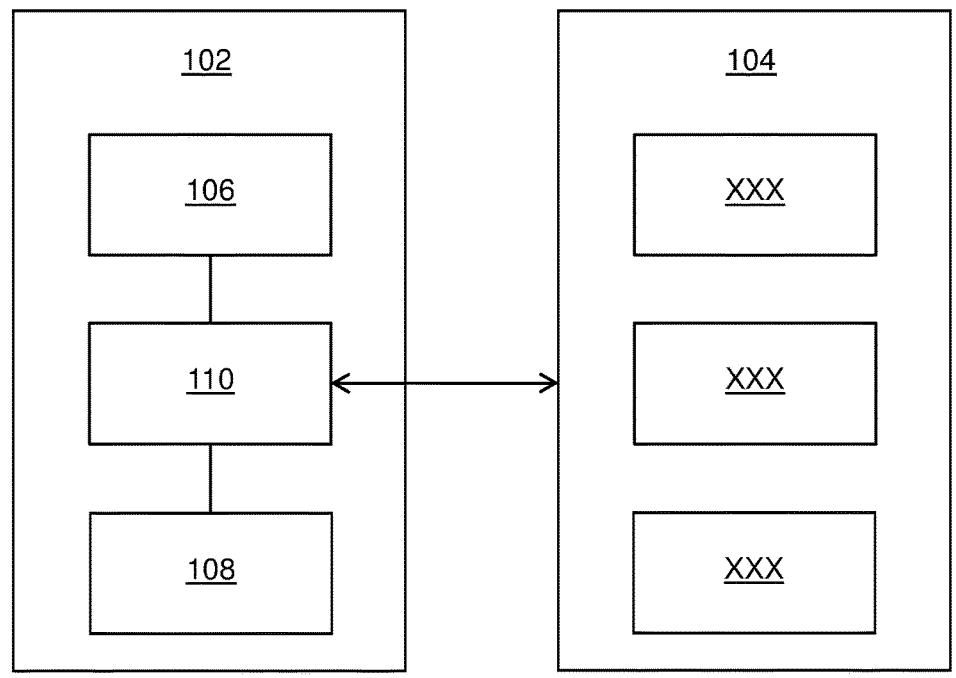
FIG. 1 is a block diagram of architectures of an imaging system and a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system comprising:
at least one imaging sensor per eye of a user; and
a processor coupled to the at least one imaging sensor, the processor being configured to control the at least one imaging sensor to capture at least one image of a real world environment,
wherein the processor is arranged to be communicably coupled with a display apparatus, the display apparatus comprising means for tracking a gaze direction of the user, at least one context image renderer for rendering a context image, and at least one focus image renderer for rendering a focus image,
further wherein the processor is configured to:
receive, from the display apparatus, information indicative of the gaze direction of the user;
determine a region of visual accuracy of the at least one image, based upon the gaze direction of the user;
process the at least one image to generate the context image and the focus image, the context image having a first resolution and the focus image having a second resolution, the second resolution being higher than the first resolution, wherein, when processing the at least one image, the processor is configured to crop the at least one image to generate the focus image in a manner that the focus image substantially corresponds to the region of visual accuracy of the at least one image; and
communicate the generated context image and the generated focus image to the display apparatus.

In another aspect, an embodiment of the present disclosure provides a method of producing a context image and a focus image for a display apparatus, via an imaging system comprising at least one imaging sensor per eye of a user, the imaging system being communicably coupled with the display apparatus, the method comprising:
receiving, from the display apparatus, information indicative of a gaze direction of the user;
controlling the at least one imaging sensor to capture at least one image of a real world environment;
determining a region of visual accuracy of the at least one image, based upon the gaze direction of the user;
processing the at least one image to generate the context image and the focus image, the context image having a first resolution and the focus image having a second resolution, the second resolution being higher than the first resolution, wherein the processing of the at least one image comprises cropping the at least one image to generate the focus image in a manner that the focus image substantially corresponds to the region of visual accuracy of the at least one image; and
communicating the generated context image and the generated focus image to the display apparatus.

The present disclosure provides the aforementioned imaging system and the aforementioned method of producing the context image and the focus image for the display apparatus, via such an imaging system. The described imaging system allows for reduction of noise within the context and focus images. Furthermore, the at least one imaging sensor of such an imaging system allows for capturing the at least one image of the real world environment at a very high resolution, without increase in a number of photo sensors thereof. Beneficially, the described imaging system meets data throughput limitations of a communication network between the processor and the display apparatus. Moreover, the described imaging system and method allow for significant reduction in amount of power required to capture and process the captured at least one image, and power required to communicate the generated focus and context images to the display apparatus.

Throughout the present disclosure, the term "imaging system" relates to equipment configured to produce the context image and the focus image for the display apparatus. It will be appreciated that the context and focus images produced by the imaging system described herein, are employed to present a simulated environment to the user of the display apparatus, when the display apparatus is worn by the user. In such an instance, the display apparatus is operable to act as a device (for example, such as a virtual reality headset, a pair of virtual reality glasses, and the like) for presenting the simulated environment to the user.

Throughout the present disclosure, the term "at least one imaging sensor" relates to equipment that is operable to detect and process light from the real world environment to capture the at least one image of the real world environment. In such an instance, the at least one image of the real world environment may be captured from a same perspective or different perspectives. Optionally, the at least one imaging sensor per eye of the user comprises a plurality of photo sensors. More optionally, the plurality of photo sensors is arranged in a grid-like manner. In such an instance, each of the plurality of photo sensors generates a charge proportional to an amount of light incident thereon, to constitute the at least one image. Examples of the plurality of photo sensors include, but are not limited to, photodiodes, photoresistors, phototransistors, and photosensitive field effect transistors. Optionally, a pixel pitch between the plurality of photo sensors is of the order of a few microns. Furthermore, optionally, a colour filter mosaic is superposed on the plurality of photo sensors of the at least one imaging sensor. More optionally, the colour filter mosaic comprises a plurality of colour filters, wherein one colour filter is superposed on one photo sensor of the at least one imaging sensor. In such an instance, the plurality of colour filters is employed to filter the light from the real world environment, prior to incidence of such light onto the plurality of photo sensors. Specifically, each colour filter is configured to pass therethrough, only light within a specific wavelength range. Consequently, filtered light from the real world environment is incident on the plurality of photo sensors. It will be appreciated that such arrangement of the colour filer mosaic allows for capturing wavelength information in the light from the real world environment, to produce colours in the captured at least one image of the real world environment.

Optionally, in this regard, the plurality of colour filters comprises green colour filters, blue colour filters, and red colour filters in a ratio 2:1:1. In such an instance, a number of the green colour filter is twice as much as a number of both the blue colour filters and the red colour filters. As an example, a colour filter mosaic M1 may be superposed on a 4×4 grid of photo sensors. In such an example, the colour filter mosaic M1 comprises 16 colour filters, wherein green, blue and red colour filters are in a ratio 2:1:1. Therefore, the colour filter mosaic comprises 8 green colour filters, 4 blue colour filters, and 4 red colour filters.

Furthermore, optionally, the green, blue and red colour filters of the colour filter mosaic are arranged in quad groups (namely, in 2×2 sub-mosaic groups). In such an instance a quad group of a given colour filter comprises 4 filters of the given colour, arranged as a 2×2 grid. Referring to the aforementioned example, the 16 colour filters of the colour filter mosaic M1 are arranged in 4 quad groups Q1, Q2, Q3, and Q4. In such an instance, two quad groups, for example, such as the quad groups Q1 and Q3 may be quad groups of the green colour filter. Furthermore, the quad group Q2 may be a quad group of the red colour filter whereas the quad group Q4 may be a quad group of the blue colour filter.

Moreover, optionally, the quad groups of the green, blue and red colour filters are arranged in a manner that the green colour filter quad groups occur at every other position along both orthogonal axes of the colour filter mosaic. In such an instance, the quad groups of the green, blue and red colour filters are arranged to form an interlaid array pattern of the colour filter mosaic, wherein one array position of the colour filter mosaic corresponds to one quad group of a given colour. Therefore, in such an interlaid array pattern, green colour filter quad groups occur at every other position (namely, at every alternate position) along both orthogonal axes of the colour filter mosaic. Furthermore, one such exemplary colour filter mosaic comprising quad groups of colour filters has been elucidated in conjunction with FIG. 2.

As mentioned previously, the processor is coupled to the at least one imaging sensor and is configured to control the at least one imaging sensor to capture the at least one image of the real world environment. Furthermore, the the processor is arranged to be communicably coupled with the display apparatus. In an embodiment, the processor is implemented by way of hardware, software, firmware or a combination of these, suitable for controlling the operation of the at least one imaging sensor.

It will be appreciated that the captured at least one image of the real world environment are employed to produce the context and focus images for the display apparatus, wherein the produced context and focus images are employed to present the simulated environment to the user of the display apparatus.

In one implementation, the imaging system is implemented on the display apparatus. In such an instance, the at least one imaging sensor and the processor are mounted on the display apparatus. Furthermore, the at least one imaging sensor may be mounted, for example, on an outer surface of the display apparatus, such that the at least one imaging sensor faces the real world environment. Furthermore, in such an instance, the processor may be mounted, for example, on an inner surface of the display apparatus. Therefore, in such an implementation, the processor may be communicably coupled with the display apparatus by way of wires (namely, in a wired manner).

In another implementation, the imaging system is implemented on a remote device. In such an instance, the at least one imaging sensor and the processor are mounted on the remote device, and are therefore external to the display apparatus. Furthermore, in such an implementation, the remote device may be positioned within the real world environment whereas the user of the display apparatus may be positioned away from (namely, at a distance from) the remote device. Therefore, in such an implementation, the processor may be communicably coupled with the display apparatus wirelessly (namely, via a wireless interface). Optionally, the remote device is one of: a drone, a robot.

As mentioned previously, the display apparatus comprises the means for detecting the gaze direction of the user, the at least one context image renderer for rendering the context image, and the at least one focus image renderer for rendering the focus image. Throughout the present disclosure, the term "means for detecting the gaze direction" used herein relates to specialized equipment for detecting a direction of gaze of the user of the display apparatus. Beneficially, an accurate detection of the gaze direction facilitates the display apparatus to closely implement gaze contingency thereon. As an example, the means for detecting the gaze direction may be employed to detect the gaze direction of the user, for projecting the focus image on and around the fovea of the user's eyes and for projecting the context image on the retina of the user's eyes, of which the fovea is just a small part. Therefore, even upon a change in the gaze direction (namely, due to a movement of the user's eyes), the focus image is projected on and around the fovea and the context image is projected on the retina, for implementing active foveation in the display apparatus.

Throughout the present disclosure, the term "context image renderer" used herein relates to equipment configured to facilitate rendering of the context image. Similarly, the term "focus image renderer" used herein relates to equipment configured to facilitate rendering of the focus image. It will be appreciated that the context image relates to a wide image of the real world environment, to be rendered and projected via the display apparatus. Furthermore, the focus image relates to another image depicting a part (namely, a portion) of the real world environment, to be rendered and projected via the display apparatus. Moreover, the focus image is dimensionally smaller than the context image.

In an embodiment, the context image renderer and/or the focus image renderer are implemented by way of at least one projector configured to emit the projection of the context image and/or the focus image therefrom. In another embodiment, the context image renderer is implemented by way of at least one context display configured to emit the projection of the rendered context image therefrom, and the focus image renderer is implemented by way of at least one focus display configured to emit the projection of the rendered focus image therefrom.

As mentioned previously, the processor is configured to receive, from the display apparatus, the information indicative of the gaze direction of the user. It will be appreciated that such information is obtained by the means for detecting the gaze direction of the user, and thereafter, communicated from the display apparatus to the processor.

Furthermore, the processor is configured to determine the region of visual accuracy of the at least one image, based upon the gaze direction of the user. Throughout the present disclosure, the term "region of visual accuracy" relates to a region of the at least one image whereat the detected gaze direction of the user's eyes may be focused. It will be appreciated that the region of visual accuracy is a region of interest (namely, a fixation region) within the at least one image, and is to be projected onto the fovea of the user's eyes. Specifically, the region of visual accuracy may be the region of focus of the user's gaze within the at least one image. Therefore, it is to be understood that the region of visual accuracy relates to a region resolved to a much greater detail as compared to other regions of the at least one image, when the at least one image is viewed by a human visual system (namely, by the user's eyes).

Furthermore, the processor is configured to process the at least one image to generate the context image and the focus image. The context image has the first resolution and the focus image has the second resolution, the second resolution being higher than the first resolution. When processing the at least one image, the processor is configured to crop the at least one image to generate the focus image in a manner that the focus image substantially corresponds to the region of visual accuracy of the at least one image. Optionally, the processor is configured to crop the at least one image to a predefined shape when generating the focus image. More optionally, the predefined shape is determined according to a shape of the region of visual accuracy of the at least one image. Examples of the predefined shape include, but are not limited to, a circle, a polygon, and an ellipse. It will be appreciated that the aforesaid cropping of the at least one image beneficially allows for a reduction in size thereof, and consequently, a reduction in transmission bandwidth required to communicate the generated focus image from the reduced at least one image, to the display apparatus. As an example, a gaze direction of the user for an image of a real world beach environment may be detected to be towards a round ball lying on the beach. In such an instance, a region of visual accuracy of the image may be determined to be a circular shaped region including the ball. Therefore, in such an instance, the processor may crop the image of the real world beach environment to a predefined shape, for example, such as a circle, while generating the focus image.

Furthermore, optionally, the processor is configured to perform sampling and readout of the plurality of photo sensors of the at least one imaging sensor while generating the context image. More optionally, the processor is configured to control sampling and readout circuitry of the at least one imaging sensor, to implement the aforesaid sampling and readout operation. It will be appreciated that in such an instance, each of the plurality of photo sensors of the at least one imaging sensor is sampled and read out to obtain full resolution output data from the at least one imaging sensor. Optionally, such full resolution output data from the at least one imaging sensor comprises a plurality of numbers indicative of the charge generated by the plurality of photo sensors of the at least one imaging sensor. Beneficially, such full resolution output data preserves all information (for example, such as wavelength information, exposure information, and the like) captured by the at least one imaging sensor to facilitate the generation of the context image.

Optionally, the processor is further configured to implement scaling of the at least one image while generating the context image. In such an instance, the at least one image is scaled up (namely, enlarged) or scaled down (namely, reduced) dimensionally while generating the context image. In an embodiment, the at least one image is scaled without changing a number of pixels of the at least one image. In another embodiment, the at least one image is scaled by adjusting the number of pixels of the at least one image. In such an embodiment, while scaling up the at least one image, the number of pixels of the at least one image are increased whereas while scaling down the at least one image, the number of pixels of the at least one image are decreased. Optionally, adjusting the number of pixels of the at least one image comprises employing an interpolation technique. Such interpolation technique may also be referred to as "demosaicing". Examples of the interpolation technique include, but are not limited to, nearest-neighbor interpolation, bilinear interpolation, bicubic interpolation, mipmap-based interpolation, fourier transform-based interpolation, and edge-directed interpolation.

Optionally, the processor is configured to bin pixels of the at least one image when generating the focus image and/or the context image. It will be appreciated that pixels of a given image correspond to the plurality of photo sensors of the at least one imaging sensor employed to capture the given image. Therefore, the pixels of the at least one image of the real world environment correspond to the plurality of photo sensors of the at least one imaging sensor. Optionally, in this regard, a number of the pixels of the captured at least one image is same as a number of the plurality of photo sensors of the at least one imaging sensor. Therefore, binning the pixels of the at least one image may be understood to be same as binning output data (namely, charge values) of plurality of photo sensors of the at least one imaging sensor. It will be appreciated that processor implements the aforesaid binning of the pixels of the at least one image, by combining the charge generated by the plurality of photo sensors of the at least one imaging sensor, in groups of four. In such a case, the charge generated by groups of four photo sensors is combined to generate a single resultant charge corresponding to each group. Consequently, the resultant charge values corresponding to each group of binned photo sensors of the at least one imaging sensor is sampled and read out to obtain cumulative binned output data from the at least one imaging sensor. Such cumulative binned output data comprises at least one number indicative of the resultant charge generated by at least one group of binned photo sensors of the at least one imaging sensor. Optionally, in this regard, the charge generated by four adjacent photo sensors is combined. In such an instance, the four adjacent photo sensors constitute a group of binned photo sensors, and generates the single resultant charge corresponding thereto. As an example, an imaging sensor IS1 may comprise 16 photo sensors P1-P16. In such an example, the processor may be configured to bin pixels of an image captured by the imaging sensor IS1, by combining charge generated by the photo sensors P1-P16 of the imaging sensor IS1, in groups of four. For example, charge from adjacent photo sensors P1-P4 may be combined to generate a resultant charge R1, charge from adjacent photo sensors P5-P8 may be combined to generate a resultant charge R2, charge from adjacent photo sensors P9-P12 may be combined to generate a resultant charge R3, and charge from adjacent photo sensors P13-P16 may be combined to generate a resultant charge R4.

Furthermore, optionally, binning the pixels of the at least one image comprises combining outputs of photo sensors corresponding to quad groups of the colour filter mosaic. In such an instance, the outputs (namely, charge values) of four photo sensors having a quad group of a given colour filter superposed thereon, are combined together to generate a resultant charge corresponding to the quad group of the given colour filter. Referring to the aforementioned example describing the imaging sensor IS1 comprising 16 photo sensors P1-P16, a colour filter mosaic M2 may be superposed on the 16 photo sensors P1-P16. In such an example, the colour filter mosaic M2 may comprise four quad groups G1-G4 of colour filters, wherein the quad groups G1, G2, G3, and G4 are quad groups of green colour filters, red colour filters, green colour filters, and blue colour filters respectively. In such an example, the quad group G1 may be superposed on the photo sensors P1-P4, the quad group G2 may be superposed on the photo sensors P5-P8, the quad group G3 may be superposed on the photo sensors P9-P12, and the quad group G4 may be superposed on the photo sensors P13-P16. Therefore, binning the pixels of the at least one image may comprise combining outputs of the photo sensors P1-P4, P5-P8, P9-P12, and P13-P16 corresponding to the quad groups G1, G2, G3, and G4 respectively, of the colour filter mosaic M2. Furthermore, in such an example, the aforesaid binning may generate resultant charges R1, R2, R3, and R4 corresponding to the quad groups G1, G2, G3, and G4.

It will be appreciated that the aforesaid binning operation allows for increasing frame rate of the at least one imaging sensor. Furthermore, such binning facilitates reduction of noise within the generated focus and/or context images, and consequently allows for improvement in signal to noise ratio within the focus and/or context images.

As mentioned previously, the processor is configured to communicate the generated context image and the generated focus image to the display apparatus. In such an instance, the processor communicates at least one data stream to the display apparatus wherein the at least one data stream comprises the generated focus image and the generated context image. In one implementation, the generated focus and context images are communicated to the display apparatus in a same data stream. It will be appreciated such an implementation allows for a reduction in transmission bandwidth required to communicate the generated focus and context images to the display apparatus. Consequently, such an implementation may be utilized to meet data throughput limitations of a communication network between the processor and the display apparatus. Furthermore, such an implementation may allow for a significant reduction in power consumption of the imaging system and required processing power for the processor. In another implementation, the generated focus and context images are communicated to the display apparatus in different data streams.

Optionally, the imaging system comprises means for adjusting an orientation of the at least one imaging sensor, wherein the display apparatus comprises means for tracking a head orientation of the user, and wherein the processor is configured to receive, from the display apparatus, information indicative of the head orientation of the user, and control the means for adjusting the orientation of the at least one imaging sensor, based upon the head orientation of the user. In such an instance, the orientation of the at least one imaging sensor is adjusted to allow for capturing the at least one image of the real world environment, from a perspective of the head orientation of the user. Such adjustment of the at least one imaging sensor beneficially accommodates for head movements of the user while he/she experiences the simulated environment using the display apparatus, thereby, enhancing realism within the simulated environment. It will be appreciated that such adjustment of the orientation of the at least one imaging sensor may be employed in the aforementioned implementation wherein the imaging system is implemented on the remote device. Examples of the means for tracking the head orientation of the user include, but are not limited to, a gyroscope, and an accelerometer.

Optionally, the means for adjusting the orientation of the at least one imaging sensor comprises at least one actuator. In an embodiment, the remote device is tilted and/or rotated by the aforesaid means for adjusting the orientation of the at least one imaging sensor mounted thereon. It will be appreciated that such an implementation may be beneficial when several imaging sensors are mounted on the remote device, as orientation of all the several imaging sensors may be adjusted collectively simply by tilting and/or rotating the remote device. In another embodiment, the at least one imaging sensor is tilted and/or rotated by the aforesaid means.

Furthermore, optionally, the at least one imaging sensor comprises at least one context imaging sensor per eye of the user and at least one focus imaging sensor per eye of the user, the at least one image comprising at least one first image captured by the at least one context imaging sensor and at least one second image captured by the at least one focus imaging sensor, wherein a field of view of the at least one focus imaging sensor is narrower than a field of view of the at least one context imaging sensor. In such an instance, the at least one first image captured by the at least one context imaging sensor is employed to generate the context image having the first resolution whereas the at least one second image captured by the at least one focus imaging sensor is employed to generate the focus image having the second resolution. It will be appreciated that pixels per degree the at least one second image are higher than pixels per degree of the at least one first image owing to the different fields of view of the at least one focus imaging sensor and the at least one context imaging sensor. Furthermore, the field of view of the at least one focus imaging sensor is narrower than the field of view of the at least one context imaging sensor since angular width of the focus image is lesser than angular width of the context image.

Throughout the present disclosure, the term "angular width" refers to an angular width of a given projection as seen from the user's eyes, when the display apparatus is worn by the user. It will be appreciated that the angular width of the projection of the focus image is smaller than the angular width of the projection of the context image.

Optionally, the at least one second image comprises a plurality of images. In such an instance, the plurality of images is employed for providing super resolution of the focus image, since the focus image substantially corresponds to the region of visual accuracy of the at least one image. It will be appreciated that the at least one second image used to generate the focus image substantially represents the region of visual accuracy of the at least one image.

Optionally, the processor is configured to actuate a direction of view of the at least one focus imaging sensor prior to capturing the at least one second image, based upon the gaze direction of the user. In such an instance, the at least one focus imaging sensor may be actuated to adjust the direction of view thereof. Such an adjustment allows the direction of view of the at least one focus imaging sensor to be same as the gaze direction of the user, thereby, allowing for the at least one focus imaging sensor to capture the at least one second image that depicts a region within the real world environment whereat the gaze of the user is focused. It will be appreciated that such a region substantially corresponds to the region of visual accuracy of the at least one image. Furthermore, the at least one focus imaging sensor may be actuated optically, electrically, mechanically, or by employing a combination thereof. In an example, a rotating mirror may be used to actuate the direction of view of the at least one focus imaging sensor. In another example, optical image stabilization systems may be used to actuate the direction of view of the at least one focus imaging sensor. In yet another example, two prisms may be used to actuate the direction of view of the at least one focus imaging sensor.

Additionally or alternatively, optionally, the processor is configured to crop the at least one second image to generate the focus image in a manner that the focus image substantially corresponds to the region of visual accuracy of the at least one second image. It will be appreciated that the aforesaid cropping of the at least one second image is based upon the gaze direction of the user.

Moreover, optionally, the imaging system further comprises at least one optical element for optically zooming into a region of visual accuracy of the at least one second image, the region of visual accuracy of the at least one second image being based upon the gaze direction of the user. In such an instance, the at least one optical element allows for increase in angular resolution (namely, pixels per degree field of view) of the region of visual accuracy of the at least one second image. Furthermore, such zooming operation allows for capturing the at least one second image from a wide field of view, thereby, allowing for increasing the angular resolution of the at least one second image to be superior to that of the human visual system. It is to be understood that the region of visual accuracy of the at least one second image relates to a region of the at least one second image whereat the detected gaze direction of the user's eyes may be focused. In one example, at least one aspheric lens is employed for implementing the aforesaid optical zooming operation. In another example, at least one parfocal lens is employed for implementing the aforesaid optical zooming operation.

Optionally, the processor is configured to control the at least one context imaging sensor to employ at least two different exposures using a high dynamic range technique, wherein a longer exposure from amongst the at least two different exposures is employed for a region of visual accuracy of the at least one first image, the region of visual accuracy of the at least one first image being based upon the gaze direction of the user. It will be appreciated that the high dynamic range technique allows for extending the dynamic range of the at least one context imaging sensor in a manner that the at least one first image closely mimics an actual view of the real world environment, as seen by the human visual system. In such an instance, the region of visual accuracy of the at least one first image is generated by way of the longer exposure from amongst the at least two different exposures, so as to allow for capturing the region of visual accuracy at a higher resolution (namely, with a greater degree of detail) as compared to a remaining region of the at least one first image. It will be appreciated that such a technique may be employed so that the region of visual accuracy of the at least one first image, whereat the gaze of the user is focused, is resolved to a substantially good degree of detail. Optionally, in this regard, the processor is configured to bin pixels corresponding to the region of visual accuracy of the at least one first image when employing the high dynamic range technique.

It will be appreciated that the resolution of the region of visual accuracy of the at least one first image is substantially high, owing to the employment of the longer exposure to generate such region of visual accuracy. Optionally, in this regard, the processor is configured to employ the region of visual accuracy of the at least one first image to adjust the region of visual accuracy of the at least one second image. In an example, the processor may fill in (namely, replicate) details from pixels of the region of visual accuracy of the at least one first image into pixels of the region of visual accuracy of the at least one second image, if the pixels of the region of visual accuracy of the at least one second image are defective (namely, hot pixels, dead pixels, burnt pixels, and the like).

Optionally, the processor is configured to adjust a tone of the at least one first image with respect to a tone of the at least one second image. It will be appreciated that such adjustment in the tone of the at least one first image is implemented to allow for improvement in colour consistency and consequently, quality of the at least one first image with respect to the at least one second image. Such an adjustment in the tone of the at least one first image with respect to the tone of the at least one second image improves tonal consistency between the context and focus image to be generated using the at least one first and second images. Consequently, the simulated environment presented to the user of the display apparatus, by employing the generated context and focus images, appears to be highly realistic.

The present disclosure also relates to the method as described above. Various embodiments and variants disclosed above apply mutatis mutandis to the method.

DETAILED DESCRIPTION OF THE DRAWINGS

Referring to FIG. 1, illustrated is a block diagram of architectures of an imaging system 102 and a display apparatus 104, in accordance with an embodiment of the present disclosure. The imaging system 102 comprises at least one imaging sensor per eye of a user, depicted as imaging sensors 106-108, and a processor 110 coupled to the at least one imaging sensor 106-108. The processor 110 is configured to control the at least one imaging sensor 106-108 to capture at least one image of a real world environment. As an example, the imaging sensor 106 may be associated with a left eye of the user whereas the imaging sensor 108 may be associated with a right eye of the user. Furthermore, as shown in FIG. 1, the processor 110 is arranged to be communicably coupled with the display apparatus 104. The display apparatus 104 is shown to comprise means for tracking a gaze direction 112 of the user, at least one context image renderer 114 for rendering a context image, and at least one focus image renderer 116 for rendering a focus image. The processor 110 is configured to receive, from the display apparatus 104, information indicative of the gaze direction of the user, determine a region of visual accuracy of the at least one image, based upon the gaze direction of the user, process the at least one image to generate the context image and the focus image, and communicate the generated context image and the generated focus image to the display apparatus 104.

Figure 2:
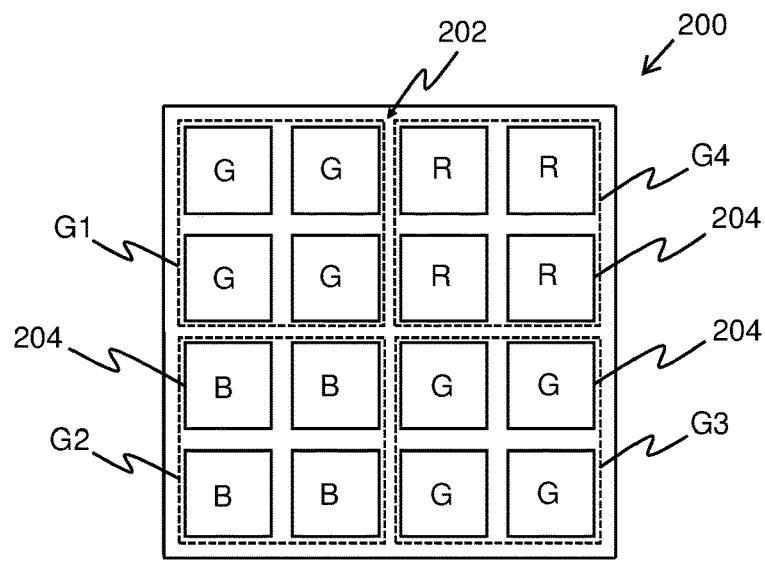
FIG. 2 is a schematic illustration of an imaging sensor (for example, such as an imaging sensor of FIG. 1), in accordance with an embodiment of the present disclosure.

Referring to FIG. 2, illustrated is a schematic illustration of an imaging sensor 200 (for example, such as an imaging sensor 106 of FIG. 1), in accordance with an embodiment of the present disclosure. Optionally, the imaging sensor 200 comprises a plurality of photo sensors (not shown) arranged in a grid-like manner. Furthermore, optionally, a colour filter mosaic 202 is superposed on the plurality of photo sensors of the imaging sensor 200. More optionally, the colour filter mosaic 202 comprises a plurality of colour filters 204, wherein one colour filter is superposed on one photo sensor of the imaging sensor 200. Optionally, in this regard, the plurality of colour filters 204 comprises green colour filters, blue colour filters, and red colour filters in a ratio 2:1:1. Furthermore, optionally, the green, blue and red colour filters of the colour filter mosaic 202 are arranged in quads groups (namely, in 2×2 sub-mosaic groups). In the exemplary imaging sensor 200 depicted in FIG. 2, the colour filter mosaic 202 superposed on the 4×4 grid of photo sensors comprises 8 green colour filters depicted as 'G', 4 blue colour filters depicted as 'B', and 4 red colour filters depicted as 'R'. As shown, the green, blue and red colour filters are arranged in quads groups G1, G2, G3, and G4. In an example, at least one context imaging sensor per eye of a user may be implemented as the imaging sensor 200 of FIG. 2.

Figure 3:
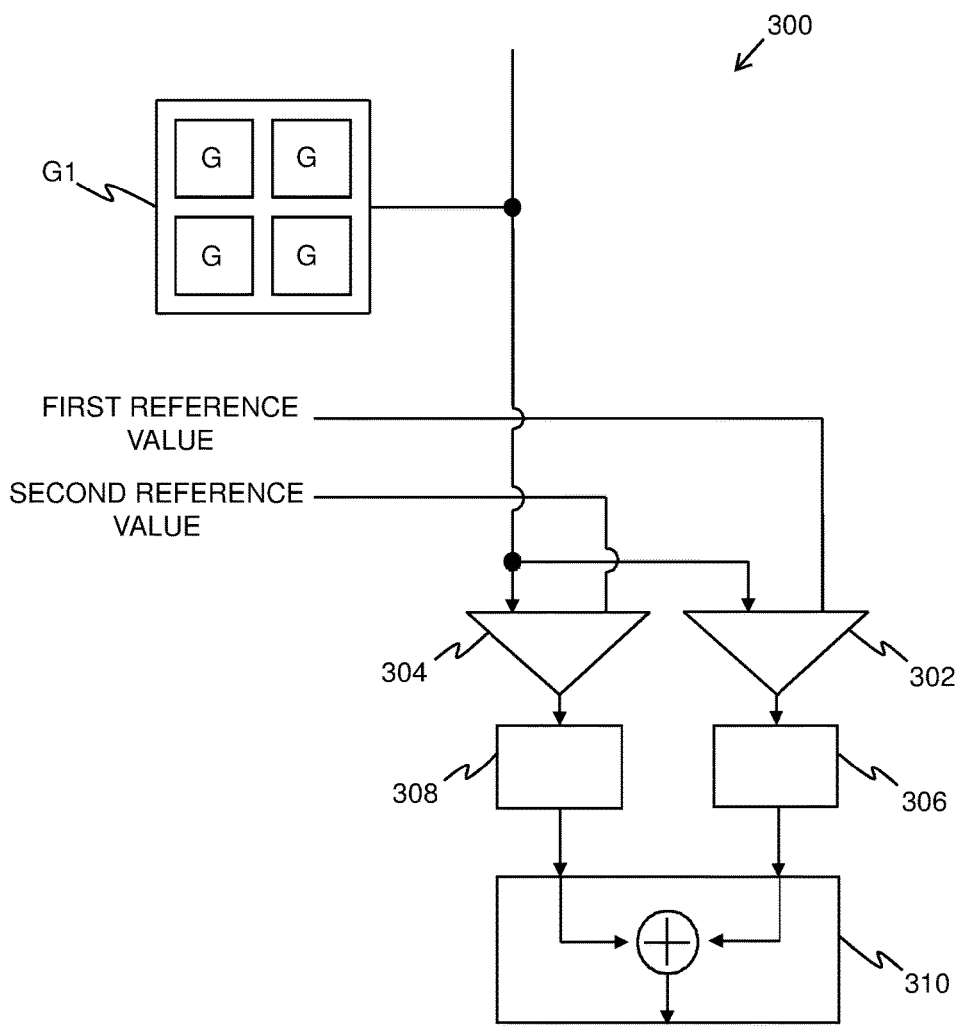
FIG. 3 is a schematic illustration of an exemplary sampling and readout circuitry of the imaging sensor shown in FIG. 2, in accordance with an embodiment of the present disclosure.

Referring to FIG. 3, illustrated is a schematic illustration of an exemplary sampling and readout circuitry 300 of the imaging sensor 200 shown in FIG. 2. The sampling and readout circuitry 300 depicted in FIG. 2 is employed for binning pixels of at least one image captured by the imaging sensor 200 by combining outputs of photo sensors corresponding to the quad group G1 of green colour filters of the colour filter mosaic 202. It will be appreciated that similar sampling and readout circuitry may be employed for combining outputs of photo sensors corresponding to the quad groups G2, G3, and G4. The sampling and readout circuitry 300 employs a Correlated Data Sampling (CDS) technique to implement the aforesaid binning operation. As shown, the sampling and readout circuitry 300 comprises two comparators 302 and 304 that compare combined output of the quad group G1 with a first reference value and a second reference value respectively, two hybrid counters/latches 306 and 308, and an averaging circuit 310.

It may be understood by a person skilled in the art that the FIG. 3 includes a simplified sampling and readout circuitry 300 of the imaging sensor 200 for sake of clarity, which should not unduly limit the scope of the claims herein. The person skilled in the art will recognize many variations, alternatives, and modifications of embodiments of the present disclosure.

Figure 4:
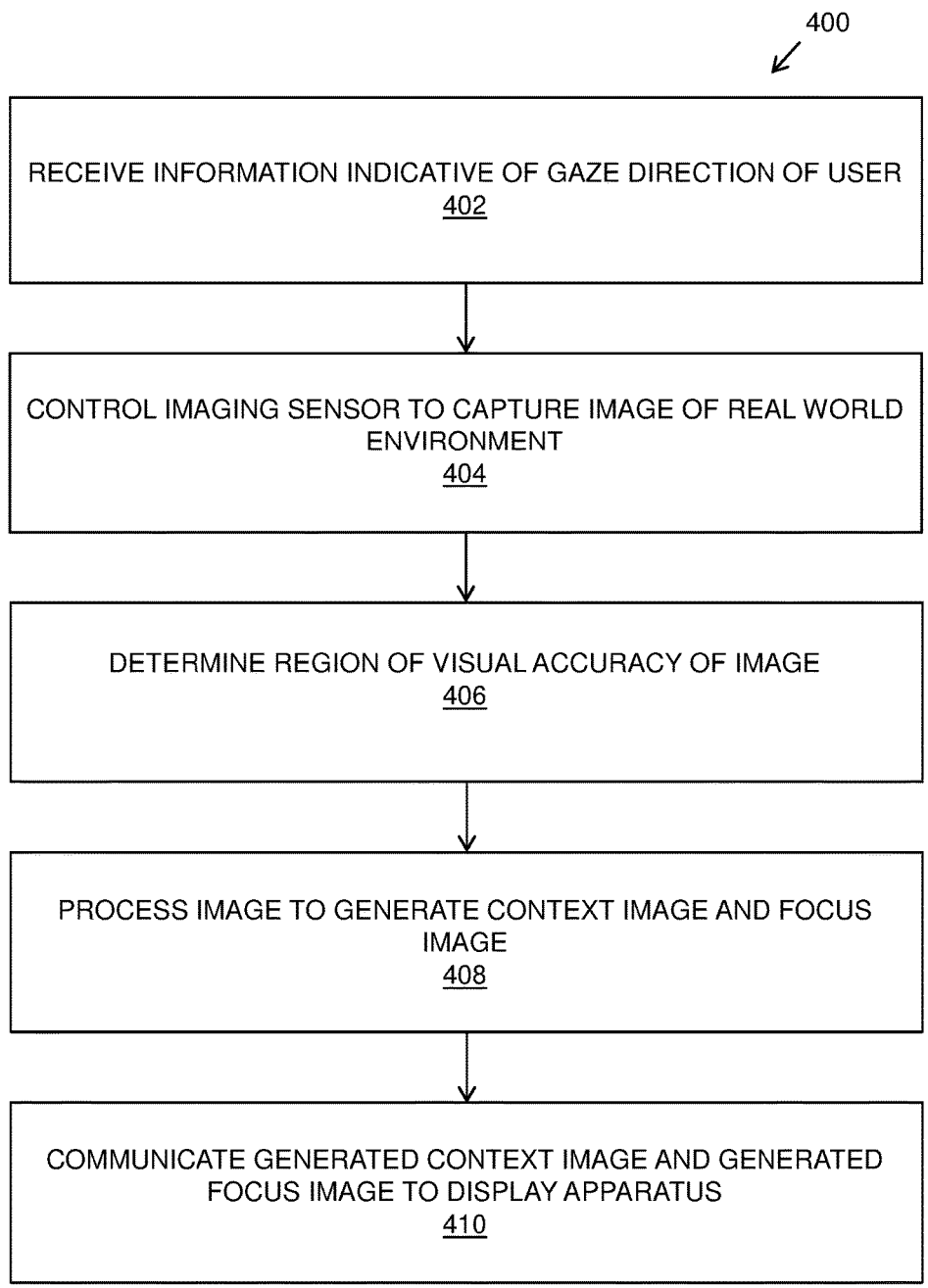
FIG. 4 illustrates steps of a method of producing a context image and a focus image for a display apparatus, via an imaging system, in accordance with an embodiment of the present disclosure.

Referring to FIG. 4, illustrated are steps of a method 400 of producing a context image and a focus image for a display apparatus, via an imaging system. At step 402, information indicative of a gaze direction of the user is received from the display apparatus. At step 404, the at least one imaging sensor is controlled to capture at least one image of a real world environment. At step 406, a region of visual accuracy of the at least one image is determined, based upon the gaze direction of the user. At step 408, the at least one image is processed to generate the context image and the focus image. The context image has a first resolution and the focus image having a second resolution. The second resolution is higher than the first resolution. Furthermore, the processing of the at least one image comprises cropping the at least one image to generate the focus image in a manner that the focus image substantially corresponds to the region of visual accuracy of the at least one image. At step 410, the generated context image and the generated focus image are communicated to the display apparatus.

The steps 402 to 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:
1. An imaging system comprising:
at least one imaging sensor per eye of a user; and
a processor coupled to the at least one imaging sensor, the processor being configured to control the at least one imaging sensor to capture at least one image of a real world environment,
wherein the processor is arranged to be communicably coupled with a display apparatus, the display apparatus comprising:
an optical combiner;
means for tracking a gaze direction of the user,
at least one context image renderer for rendering a context image of the at least one image, and
at least one focus image renderer for rendering a focus image of the at least one image, separate from the context image,
further wherein the processor is configured to:
receive, from the display apparatus, information indicative of the gaze direction of the user;
determine a region of visual accuracy of the at least one image, based upon the gaze direction of the user;
process the at least one image to:
generate the context image at a first resolution by binning pixels of the at least one image, and
generate the focus image at a second resolution higher than the first resolution by demosaicing the at least one image,
wherein, when processing the at least one image, the processor is configured to crop the at least one image to generate the focus image in a manner that the focus image substantially corresponds to the region of visual accuracy of the at least one image; and communicate the generated context image and the generated focus image to the display apparatus, wherein the optical combiner of the display apparatus is operable to optically combine the generated content image and the generated focus image for display to the user.

2. The imaging system of claim 1, further comprising means for adjusting an orientation of the at least one imaging sensor, wherein the display apparatus comprises means for tracking a head orientation of the user, and wherein the processor is configured to:

receive, from the display apparatus, information indicative of the head orientation of the user; and control the means for adjusting the orientation of the at least one imaging sensor, based upon the head orientation of the user.

3. The imaging system of claim 1, wherein the processor is configured to crop the at least one image to a predefined shape when generating the focus image.

4. The imaging system of claim 1, wherein the processor is configured to bin pixels of the at least one image when generating the focus image.

5. The imaging system of claim 1, wherein the at least one imaging sensor comprises at least one context imaging sensor per eye of the user and at least one focus imaging sensor per eye of the user, the at least one image comprising at least one first image captured by the at least one context imaging sensor and at least one second image captured by the at least one focus imaging sensor, wherein a field of view of the at least one focus imaging sensor is narrower than a field of view of the at least one context imaging sensor.

6. The imaging system of claim 5, wherein the processor is configured to actuate a direction of view of the at least one focus imaging sensor prior to capturing the at least one second image, based upon the gaze direction of the user.

7. The imaging system of claim 5, further comprising at least one optical element for optically zooming into a region of visual accuracy of the at least one second image, the region of visual accuracy of the at least one second image being based upon the gaze direction of the user.

8. The imaging system of claim 5, wherein the processor is configured to control the at least one context imaging sensor to employ at least two different exposures using a high dynamic range technique, wherein a longer exposure from amongst the at least two different exposures is employed for a region of visual accuracy of the at least one first image, the region of visual accuracy of the at least one first image being based upon the gaze direction of the user.

9. The imaging system of claim 5, wherein the processor is configured to adjust a tone of the at least one first image with respect to a tone of the at least one second image.

10. A method of producing a context image and a focus image for a display apparatus, via an imaging system comprising at least one imaging sensor per eye of a user, the imaging system being communicably coupled with the display apparatus, the method comprising:

receive, from the display apparatus, information indicative of a gaze direction of the user;

controlling the at least one imaging sensor to capture at least one image of a real world environment;

determining a region of visual accuracy of the at least one image, based upon the gaze direction of the user;

processing the at least one image to:

generate the context image at a first resolution by binning pixels of the at least one image, and generate the focus image at a second resolution higher than the first resolution by demosaicing the at least one image, wherein the processing of the at least one image comprises cropping the at least one image to generate the focus image in a manner that the focus image substantially corresponds to the region of visual accuracy of the at least one image;

communicating the generated context image and the generated focus image to the display apparatus; and optically combining the generated context image and the generated focus image for display.

11. The method of claim 10, wherein the imaging system comprises means for adjusting an orientation of the at least one imaging sensor, and wherein the method further comprises:

receiving, from the display apparatus, information indicative of a head orientation of the user; and controlling the means for adjusting the orientation of the at least one imaging sensor, based upon the head orientation of the user.

12. The method of claim 10, further comprising binning pixels of the at least one image when generating the focus image.

13. The method of claim 10, wherein the at least one imaging sensor comprises at least one context imaging sensor per eye of the user and at least one focus imaging sensor per eye of the user, the at least one image comprising at least one first image captured by the at least one context imaging sensor and at least one second image captured by the at least one focus imaging sensor, a field of view of the at least one focus imaging sensor being narrower than a field of view of the at least one context imaging sensor, and wherein the method further comprises actuating a direction of view of the at least one focus imaging sensor prior to capturing the at least one second image, based upon the gaze direction of the user.

14. The method of claim 13, further comprising employing at least one optical element of the imaging system to optically zoom into a region of visual accuracy of the at least one second image, the region of visual accuracy of the at least one second image being based upon the gaze direction of the user.

15. The method of claim 13, further comprising controlling the at least one context imaging sensor to employ at least two different exposures using a high dynamic range technique, wherein a longer exposure from amongst the at least two different exposures is employed for a region of visual accuracy of the at least one first image, the region of visual accuracy of the at least one first image being based upon the gaze direction of the user.

* * * * *